Figure 1:
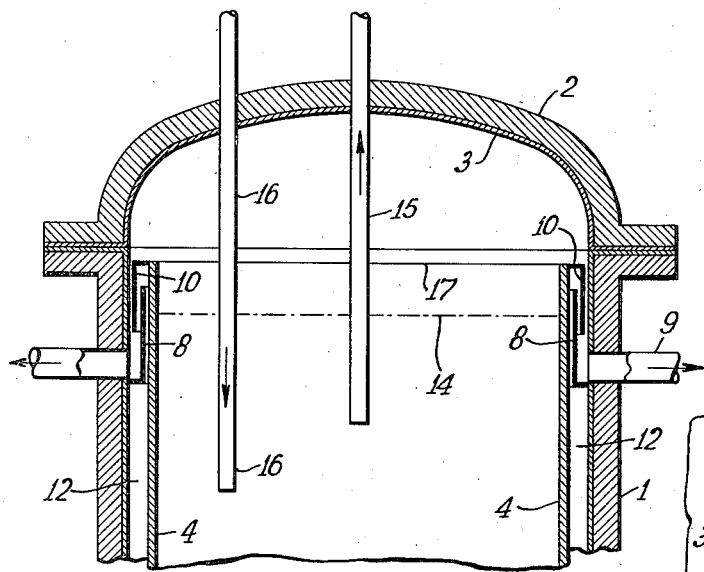

Nov. 20, 1945.　　　　W. DAVEY　　　　2,389,246
REACTION PROCESS
Filed May 15, 1941　　　5 Sheets-Sheet 1

INVENTOR
WARREN DAVEY
BY
ATTORNEY

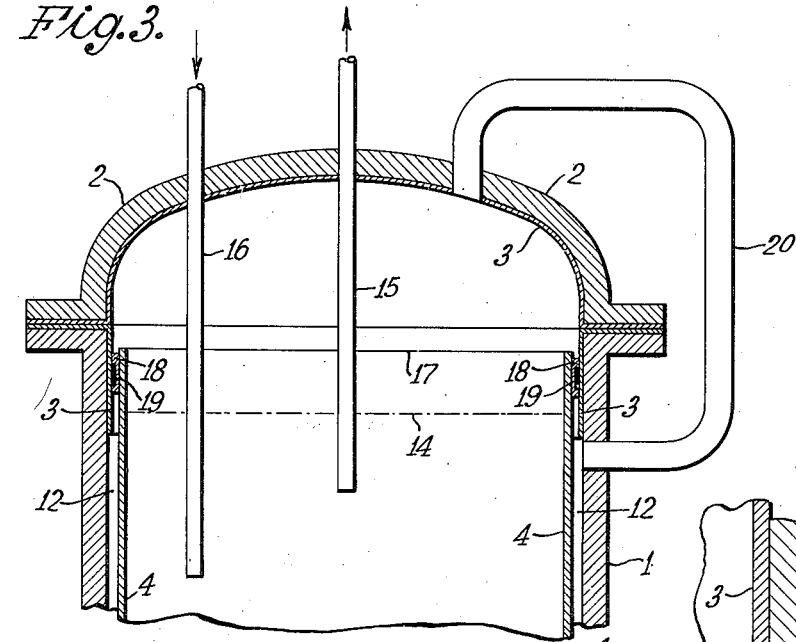
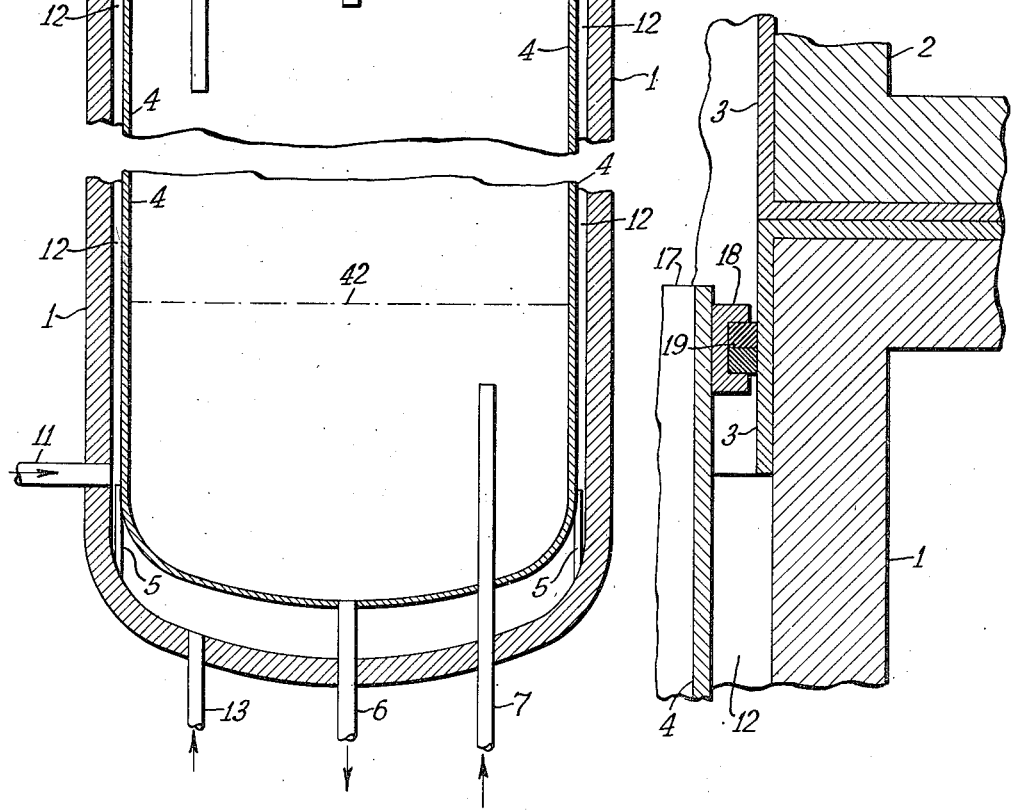

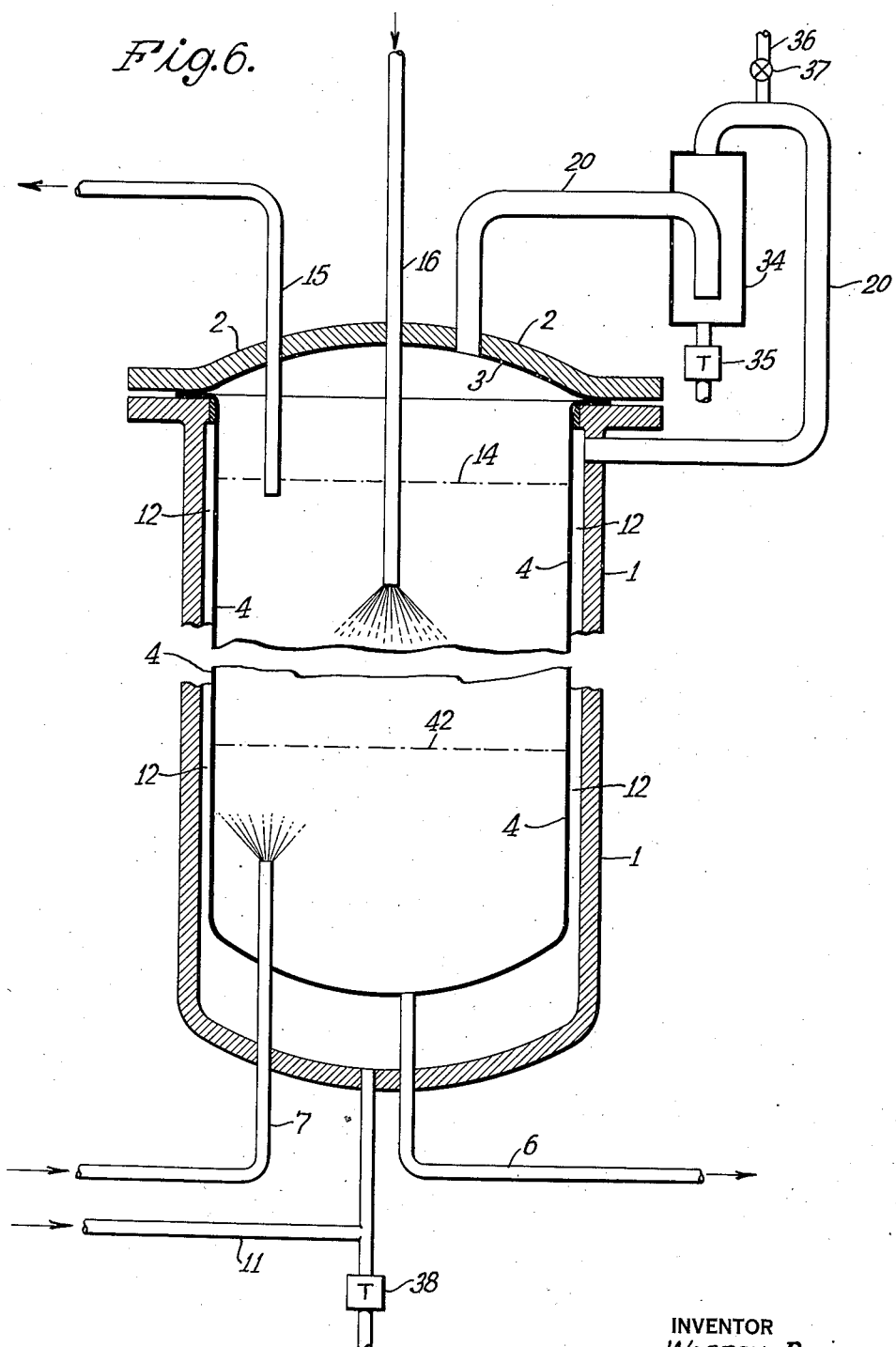

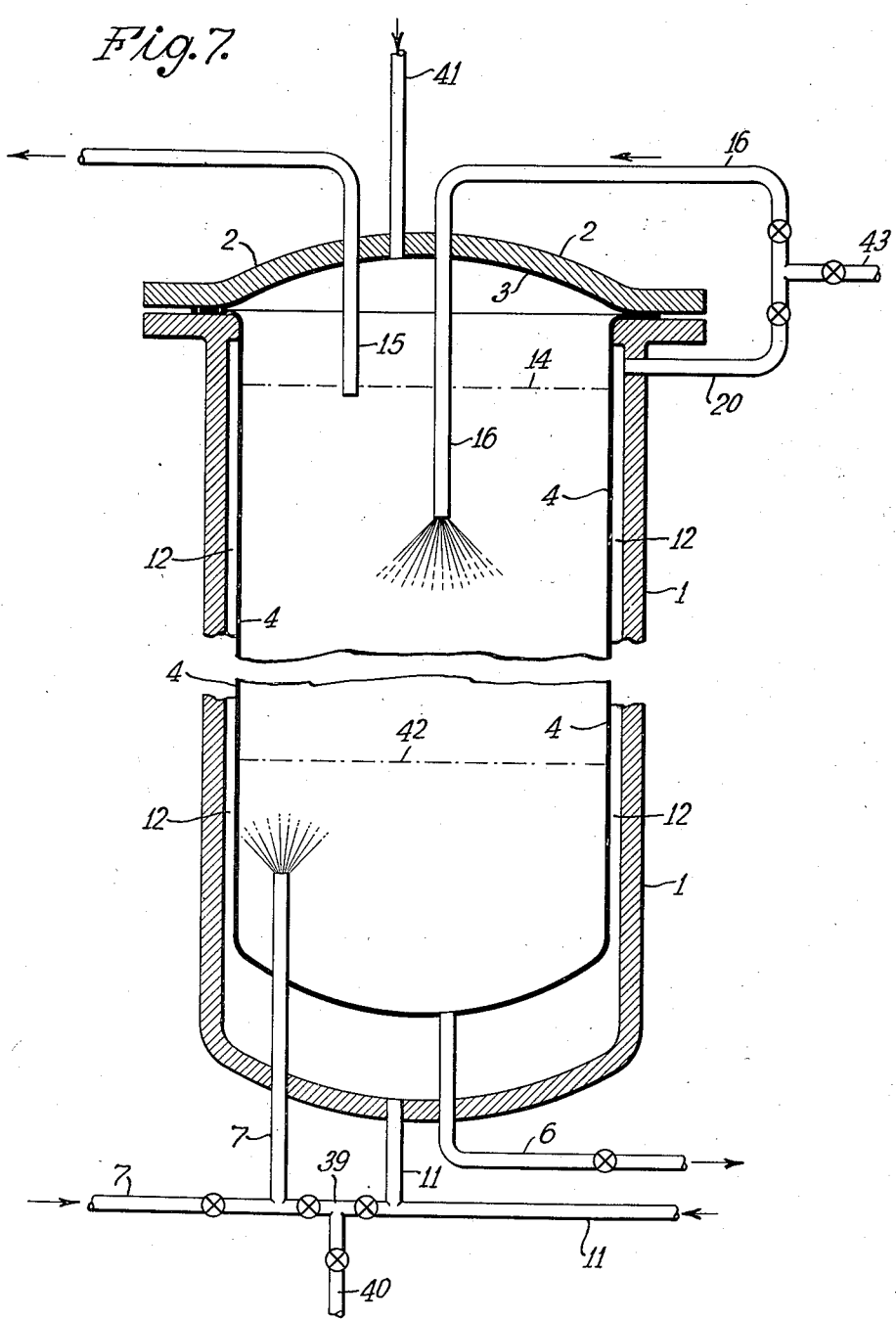

Patented Nov. 20, 1945

2,389,246

UNITED STATES PATENT OFFICE 2,389,246

REACTION PROCESS

Warren Davey, Montclair, N. J., assignor to Colgate-Palmolive-Peet Company, Jersey City, N. J., a corporation of Delaware Application May 15, 1941, Serial No. 393,649

10 Claims. (Cl. 260—415)

This invention relates to an improved process for hydrolyzing fats and oils and to novel apparatus suitable for use in this improved process, and more particularly to an improved process and novel apparatus for countercurrent hydrolysis of fats and oils.

The process of this invention is an improvement of the process disclosed in United States Patent No. 2,139,589 which issued to Martin H. Ittner. That patent discloses and claims a process for countercurrent hydrolysis of fats and oils, continuous or intermittent, in which the temperature of reaction is above about 200° C. and the pressure is sufficient to maintain the material in a liquid state, i. e., the pressure is equal to or in excess of the pressure of saturated steam at the temperature employed. Another United States patent, No. 2,156,863, contains disclosures similar to the Ittner patent but is limited to a continuous, countercurrent hydrolysis of fats and separately preheating the water and oils or fats.

Development of processes involving high temperatures and pressures has increased the necessity for vessels and apparatus which have greater corrosion resistance, since it has been found that acids and other chemicals which are generally inactive at low temperatures and pressures are very active at high temperatures and pressures and readily attack normally corrosive-resistant metals.

In attempting to overcome these objections and difficulties, steel vessels have been lined with a relatively thin layer of a more corrosion resistant metal or alloy; however, due to the wide variation in the coefficient of linear expansion of the more resistant alloys, such as the stainless steels, as compared to ordinary steel and other strong metals which are subject to corrosion, it has been found impractical in many instances to follow this procedure.

As an example, stainless steel type #317 has about one and one-half times the linear coefficient of expansion of carbon steel, consequently in a vessel seventy feet long, subjected to a temperature of 250° C., the liner, if free to expand, would expand about an inch in length more than the outer layer of carbon steel.

Such a condition would set up excessive strains in the outer shell and instances of severe buckling and ultimate breakdown of the inner layer have occurred; also, the stresses induced in the inner layer would tend to lessen its corrosion resistant properties.

Furthermore, alloys which ordinarily are resistant to the action of acids are seriously corroded when brought into contact under stress or strain with such chemicals at high temperatures and pressures. Even fatty acids, such as those employed in the manufacture of soap, become so active at high temperatures that they attack metals or alloys under stress or strain which would remain substantially resistant thereto in the absence of such stress or strain.

Moreover, in a plant which is now being used to hydrolyze fats and oils under substantially high pressures and temperatures, and in which the contents of the vessel are entirely in liquid phases, I have observed that the hydraulic shock on pumps and piping causes undue wear and tear on the entire system.

Therefore, an object of my invention is to provide a process for hydrolyzing fats and oils wherein hydraulic shock is avoided or controlled.

Another object of my invention is to provide a process for the hydrolysis of fats and oils wherein the surface of the liquid is in contact with steam.

A further object of my invention is to provide a vessel having improved corrosion resistance.

A still further object is to provide a corrosion resistant vessel wherein the pulsation of the pumps and other shocks are cushioned so that processes may be carried out therein with increased regularity and safety.

Other objects will present themselves to those skilled in the art as the disclosures are read.

The manner of accomplishing the objects of my invention with respect to the process will be understood better by considering first the manner of achieving the objects of the apparatus, the operation of which will illustrate the process.

Referring now to Figure 1, the pressure vessel 1 is preferably a carbon steel shell designed for high working pressure, fitted with a cover 2 having a suitable sealed joint for withstanding the high pressure, the entire inner surface of the vessel to be clad with a relatively thin layer of a corrosion resistant alloy 3 having substantially the same coefficient of linear expansion as the carbon steel shell. For this corrosion resistant layer, I prefer to use a chromium-nickel-iron alloy known as "Inconel" which contains approximately the following composition: nickel, 79.0 to 80.0%; chromium, 12.5 to 13.5%; iron, 6.0 to 7.0%; manganese, 0.2 to 0.3%; silicon, 0.2 to 0.3%; copper, 0.15 to 0.25%; carbon, not more than 0.15%. Other corrosion resistant metals or alloys with the proper coefficient of expansion may be used. The function of this lining will be described later.

The reaction portion of the apparatus consists of an inner open top tank 4 somewhat smaller in diameter than the carbon steel outer shell and constructed of relatively thin, highly corrosion resistant alloy. For this tank 4, I prefer to use stainless steel types #317 or #316 but other alloys or metals having similar properties with respect to corrosion resistance may be advantageously employed.

This inner tank or shell is supported on suitable legs 5, preferably not fastened to the outer shell, and is free to move either circumferentially or longitudinally, without at any time coming in contact with the outer shell and therefore is not subject to any stress or strain other than the weight of the liquid held therein.

The construction of the bottom of the inner tank 4 is so designed that the supporting legs 5 and the connecting pipes 6 and 7 are of substantially the same length and of the same material or of materials having substantially the same coefficient of expansion, so that as they become heated there will be practically no differential in their length, due to expansion.

However, if it is thought advisable, the pipes 6 and 7 passing through the outer shell may be provided with stuffing boxes and glands or other means or may be more or less curved to permit of movement relative to the outer shell, should any occur, and also provide easy access for removal of the inner shell, should occasion require it.

Figure 2:
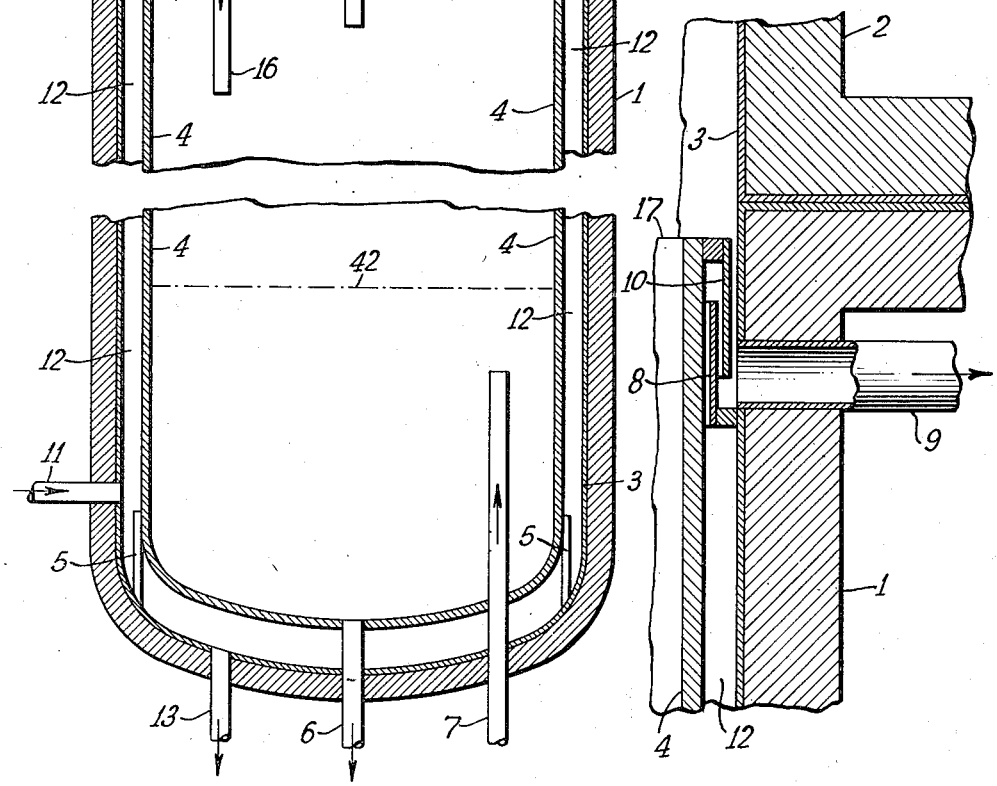

The outer carbon steel shell 1 is fitted with a trough 8, connected to drain pipes 9; and the inner shell 4 is fitted with an inverted collar 10 which fits loosely into the trough 8. This construction is clearly shown in Figure 2.

Drain pipes 9 are connected to a common receiver (not shown) fitted with a bleeder valve and suitable drainage connections. If live steam be admitted into the outer shell through pipe 11, it will be apparent that as the entire apparatus heats up, the inner shell 4 is free to expand and as the entire system becomes filled with steam, pressure may be applied up to the desired working pressure, without the inner shell being subjected thereby to pressure strains.

If the bleeder valve on the receiver above mentioned be left slightly open, there will be a continuous flow of steam past the inverted collar 10, downwardly through trough 8 and outwardly through pipes 9, thus tending to prevent the passage of any corrosive liquids or gases backwardly and down into the annular space 12 between the inner and outer shells. Any condensate formed in this annular space 12 will flow out through pipe 13 to a trap (not shown) and this will prevent any tendency of buoyance in inner shell 4.

I prefer to operate the apparatus with the liquid level 14 somewhat above the lower end of outlet pipe 15, appreciably above the end of pipe 16, and well below the upper rim 17 of the inner vessel or open top tank 4. The space above the liquid level 14 and the annular space 12 are filled with steam at a pressure that will prevent any objectionable i. e. any substantial evaporation of the water in vessel 4, and will maintain the reacting fatty material and water as liquid phases.

It has long been known that when the surface of a liquid is exposed to any space that is not already filled with the saturated vapor of that liquid, e. g., a space filled with vapor at a pressure lower than the pressure of saturated vapor at the temperature of the liquid, vapor is generated from the liquid until the space is filled with saturated vapor in temperature-pressure equilibrium with the liquid (unless the liquid present is insufficient to generate the required amount of vapor). In reaching this equilibrium, the pressure of the vapor in the space rises due to the generation of vapor and the temperature of the liquid drops due to the abstraction of heat utilized in changing the liquid into vapor, the drop in temperature depending upon the amount of vapor generated and the amount of outside heat, if any, that is supplied. It has also long been known, on the other hand, that when the surface of a liquid is exposed to any space that is filled with vapor of that liquid at a pressure higher than the pressure of saturated vapor at the temperature of the liquid, vapor is quickly condensed at the surface of the liquid until the space is filled with saturated vapor in temperature-pressure equilibrium with the liquid. In reaching this equilibrium, the pressure of the vapor in the space drops due to the condensation of vapor and the temperature of the liquid rises due to the latent heat of vaporization liberated by the condensing vapor, the rise in temperature depending upon the amount of vapor condensed and the amount of heat lost to surroundings. Temperature-pressure equilibrium between the surface of the liquid and its vapor is thus inherently and rapidly established and maintained regardless of the pressure at which vapor is supplied to a space to which the surface of the liquid is exposed.

In carrying out the hydrolysis of fats and oils by the countercurrent process in accordance with the present invention, vaporization of water within the apparatus to the extent that it causes stirring or emulsification is objectionable because it interferes with the operation of the process. The surface of the water-containing liquid in the open top tank 4 being exposed to the steam in the space in the upper part of the reaction chamber, vaporization of liquid water therein cannot be prevented unless the pressure of the steam exerted on the upper surface of the liquids is equal to or in excess of the pressure of the saturated steam at the existing temperature of the liquids in this part of the chamber. If the pressure of the steam in the upper part of the chamber is equal to the pressure of saturated steam at the temperature of the liquids in this part of the chamber, the steam and liquid are in equilibrium, i. e., they are in a stable state and there is no change in the relative quantities of steam and liquid present. On the other hand, if the pressure of the steam in the upper part of the chamber is in excess of the pressure of saturated steam at the temperature of the liquids in this part of the chamber, the steam and liquid are not in equilibrium and steam will condense, as already explained, and quickly establish temperature-pressure equilibrium.

The pressure of the steam and the temperature of the incoming fatty material and water should be controlled, preferably automatically, so that the temperature in the reaction vessel may be held at the proper point. In other words, if it is found that the liquids under process absorb more or less heat from the surrounding steam, they, i. e., the steam, the fatty material and/or the water, may be admitted to the reaction vessel at lower or higher temperatures to compensate for such absorption.

The admission of steam at a controlled pressure through pipe 11 into the annular space 12 between the inner and outer shells provides a simple means of heating the apparatus and maintaining a constant and uniform temperature throughout the entire length of the inner vessel. Any radiation losses from the surface of the outer vessel will be supplied by a portion of the steam condensing. In order to maintain the continuous flow of steam outwardly through pipes 8, there must be a continuous flow of steam inwardly through pipe 11. This inward flow of steam must be at a somewhat higher rate than the flow outwardly through pipes 9 to compensate for the condensation in the steam space. Moreover, since a pressure drop inevitably occurs in the direction of flow, the incoming steam must be at a somewhat higher pressure to overcome the flow losses. In this way not only is the temperature throughout the entire length of the inner vessel maintained constant and uniform, but the pressure of the steam in the upper part of the reaction vessel is also maintained constant and in temperature-pressure equilibrium with the liquid.

The steam so provided will form an admirable cushion to offset the surges of the incoming liquids supplied by reciprocating pumps.

I have found that "Inconel" is highly resistant to corrosion from fatty acids, although not as effective as some of the so-called stainless steels. However, it has a linear coefficient of expansion very close to that of carbon steel, and I prefer to use it for this reason as a liner on the inside of the carbon steel shell to further protect it from corrosion in the event of any unforeseen foaming or boiling over of the contents of the inner vessel. However, there are several other stainless steels or alloys which have approximately the same coefficient of expansion as carbon steel and also relatively high corrosion resistant qualities, illustrations of which are type #446, chromium 23 to 30%; type #430, chromium 14 to 18%; and type #431, chromium 14 to 18%, nickel 2% maximum; and which may be employed as liners.

The contact of fatty acids with steel, under common conditions of operation, rapidly forms a sticky iron soap which is slowly washed down by the condensate, having a tendency to corrode the outer shell, whereas the contact of fatty acids with "Inconel" forms a very adherent soap film which protects the balance of the "Inconel" from further serious attack; furthermore, if some of the processed material should pass over into the annular space between the inner and outer shells, it can readily be detected in the condensate and the free acids or fats may be easily removed before appreciable attack on the clad material occurs.

I have also found that the volatile acids generated and the steam have practically no appreciable corrosive effect on "Inconel" so that the exposed part of the outer shell 1 and the cover 2 may safely be lined with this material.

Although the above description applies primarily to an apparatus especially suitable for carrying out a process requiring high pressure, it is obvious that a similar construction may be used at any workable pressure, such as sub-atmospheric or high vacua for distillation or other purposes, since the equalization of the pressure inside and outside the inner vessel may be maintained regardless of pressure. This apparatus is well suited for the process of countercurrently hydrolyzing fats and oils by the use of water, such as is disclosed in the Ittner patent hereinbefore referred to except, as will be clear from the foregoing, that in this process of hydrolysis, as carried out in this apparatus, the liquid material in the upper part of the pressure vessel will be in direct connection with the steam that is supplied.

It is also possible to use other mediums than steam, such as an inert gas, for equalizing the pressure if it is impractical to use steam in the process involved.

Also, in processes where there is no tendency to foam or boil over, the trough 8, drain pipes 9 and inverted collar 10 may be dispensed with and the inner corrosion resistant vessel constructed simply as an open top tank, within an outer shell.

It is also possible to dispense with the inner liner 3, in the pressure vessel 1, in using the apparatus for certain purposes, if it should be considered unnecessary.

A further design and application of the fundamental principles of my invention is shown in Figures 3 and 4, in which: 1 is a carbon steel shell designed for high pressures, fitted with a cover 2 having a suitable sealed joint for withstanding pressure. The cover 2 and upper portion of shell 1 are lined with a relatively thin layer 3 of a suitable corrosion resistant alloy.

The reaction portion of the apparatus consists of an inner open top tank 4, as previously described. The upper edge 17 of tank 4 is fitted with a recessed ring 18 in which are fitted expansion rings 19 which form a substantially tight sliding seal against the inner liner 3 of the outer shell 1.

Pipe 20 passing through the outer shell 1 below the sliding seal connects the annular space 12 between the inner and outer shells with the space below the cover 2 in such manner as to equalize the pressure within the several parts of the vessel, as described above.

The leakage through the sliding seal will thus be minimized due to the substantially balanced pressure above and below.

Figure 5:
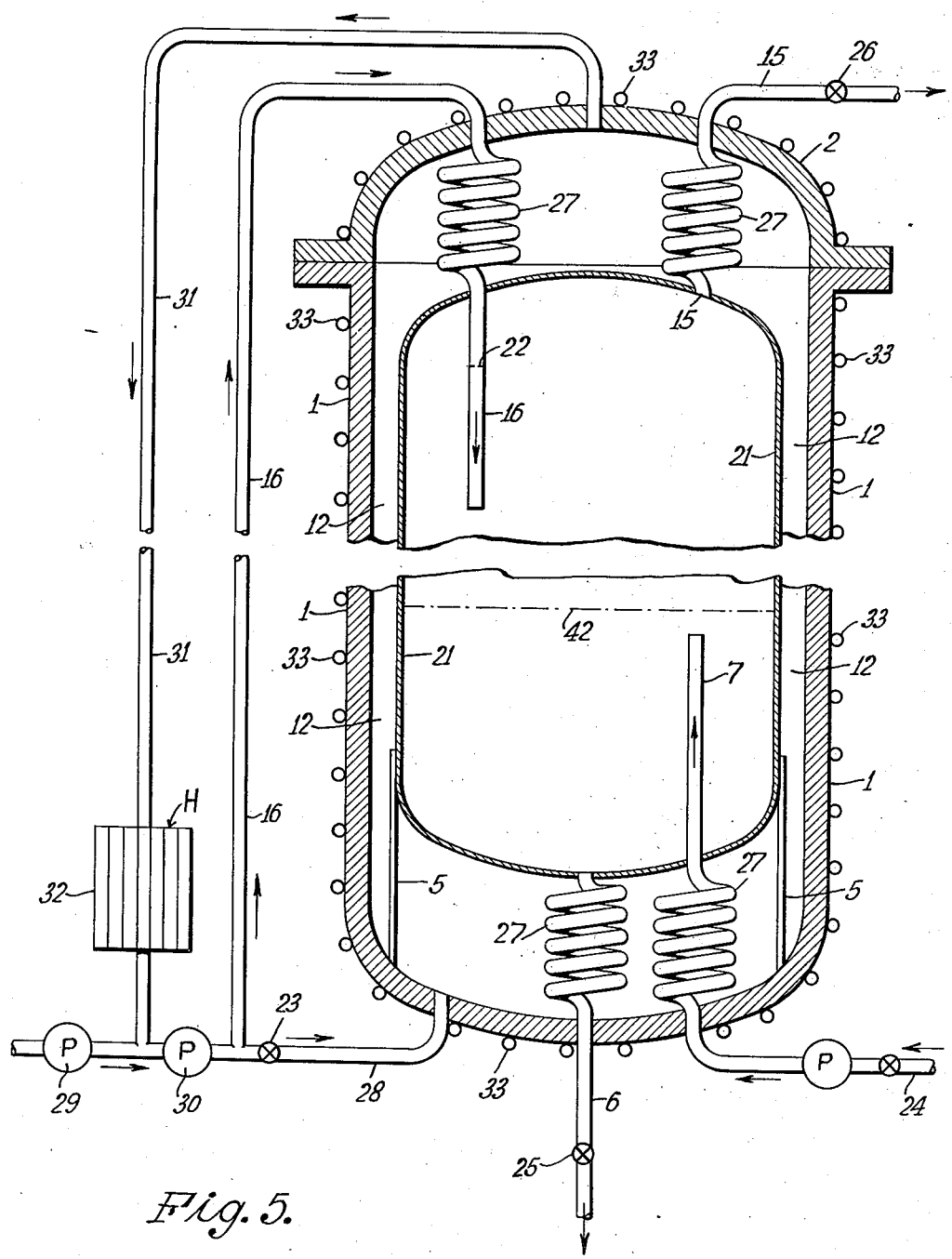

In cases where it is desirable to carry on a reaction in which the materials must be kept away from any contact with steam or gas, I would prefer to use an apparatus as shown in Figure 5, in which: 1 may be the carbon steel pressure vessel fitted with a cover 2, as previously described.

The reaction portion of the apparatus consists of a vessel 21 with a closed top, said vessel being either hermetically sealed or fitted with flanges (not shown) for the purpose of opening for inspection. Among other functions, the top serves as a means to prevent any liquids from passing between the walls of the inner and outer vessels into space 12. In order to operate advantageously, it is desirable to have the pressure on the outer side of the inner closed reaction vessel slightly in excess of the pressure inside of the inner closed reaction vessel. This may be accomplished by a suitable orifice 22 in inlet pipe 16 or a multiplicity of small orifices or jets at the discharge end of pipe 16, or by other means.

The differential in pressure and the relative rates of flow of water and fat may be controlled by suitable valves 23 and 24, and the proportions of the discharged materials may be controlled by suitable relief valves 25 and 26 which are preferably automatically operated.

The supply pipes 7 and 16 and the discharge pipes 6 and 15 are so designed with expansion coils 27 or stuffing boxes and glands (not shown) to allow the inner shell to expand freely.

In the application of the type of apparatus shown in Figure 5 to the hydrolysis of fats and oils, as described in Ittner United States Patent No. 2,139,589, the space 12 surrounding the inner corrosion resistant vessel may be completely filled with water and the inner vessel completely filled with water and oil.

Water for saponification may then be supplied through pipe 16 and the pressure in the apparatus equalized through pipe 28.

Loss of heat through radiation may be compensated for in several ways.

Pump 29 may supply an excess of heated water over and above the amount needed for saponification, and a constant flow of this heated water may be maintained through the space 12 surrounding the inner vessel. This excess water, having been slightly cooled by radiation from vessel 1, may be returned by pipe 31 to the pump 30 after passing through a reheater 32 where it is again heated to the desired temperature.

Also, loss of heat through radiation may be compensated for by a suitable heating device 33, surrounding and in contact with the outer shell 1. This may consist of coils of pipe through which is passed hot circulating liquids or vapors; or the heating device may consist of electric heaters of any suitable type.

In the event that a process requires the admixture of two or more corrosive materials, so that it would be impractical to supply one of them through pipe 16, thus allowing a possible contamination through pipe 28, a suitable equalizing device (not shown) may be employed such as a diaphragm chamber between pipes 16 and 28 to maintain the balance. Suitable pressure relief may be provided, as a relief valve attached to pipe 28 (not shown) to prevent hydrostatic pressure from building up in vessel 1.

Also, an expansion chamber may be provided externally, if necessary, to control the surges due to pump pulsations.

The arrows showing the direction of flow in Figure 5 show a preferred method of accomplishing the desired result.

Figure 6 shows diagrammatically a modification of the apparatus shown in Figure 1 or Figure 3. Instead of the open top inner tank as shown in Figures 1 and 3, that illustrated in Figure 6 is closed. In this apparatus, saturated steam or other gas for heating is admitted through pipe 11 to the space 12 between tank 4 and vessel 1, which space 12 is connected with the space above the liquid surface 14 in tank 4 by means of connecting pipe 20, thus insuring the same pressure within the tank 4 as that within the space 12 between tank 4 and vessel 1. Pipe 20 passes through separator 34, fitted with a trap 35 for removing any condensate. Through pipe 36 which connects with pipe 20 additional steam may be supplied to the system or may be removed therefrom. This pipe 36 is equipped with valve 17 for appropriate control of addition to or removal from a system of steam or gas. Pipe 11 is also equipped with a trap 38 to facilitate removal of any condensate from the space 12 between tank 4 and vessel 1. Thus, Figure 6 is adapted to a process in which equal pressure between a gas which may be used for heating and the materials undergoing reaction for hydrolysis is maintained. As has been pointed out hereinbefore, this condition eliminates shock or unusual strain caused by surges due to pumping pulsations.

Figure 7 is a modification of Figure 5 whereby the liquid to be added to the interior of tank 4 (water in the case of hydrolysis of fats and oils) is supplied through pipe 11 to the space 12 surrounding tank 4 within vessel 1 and passes through pipe 20 and then to pipe 16 from which it is discharged into tank 4. A pipe 43 may be connected with pipes 20 and 16 through suitable valves for further control of the supply of water to inner tank 4. A T 39 connects pipes 7 and 11 and contains valves therein by which the liquid introduced through pipe 11 may be supplied to tank 4 through pipe 7, or the contents of tank 4 may be withdrawn through pipe 7, T 39 and pipe 40; thus, further facilitating the filling or emptying of tank 4. Steam or other gas may be supplied to the space above the surface 14 of the liquid through pipe 41 and thus serve as a cushion, as explained hereinbefore.

While in no way confined to the hydrolysis of fats and oils, an example of the operation of the apparatus for that purpose may be described briefly as follows:

Referring to Figure 1: assume the inner vessel to contain water up to the line 42 and fatty material above the water to the line 14 and the space above the line 14 and the entire space 12 surrounding the inner vessel filled with saturated steam under pressure, for example about 640 pounds, and the oil and liquid water being at a temperature known to be suitable for countercurrent hydrolysis, say 250° C.

Outlet pipes 6 and 15 are fitted with suitable control valves (not shown) to maintain the proper operating pressure by release of aqueous glycerine solution and fatty acids respectively.

Fatty material and water may now be pumped into the inner vessel, countercurrently in proper amounts and proper proportions continuously or in an intermittent or semi-continuous manner, with continuous, intermittent or alternate introduction of fatty material and water through pipes 7 and 16 respectively.

The fatty material will pass up through the bottom water layer where it undergoes hydrolysis to form glycerine and fatty acids. The glycerine being soluble in the water will be retained there, and the fatty acids will pass on into the space indicated between 42 and 14, which will be largely composed of free fatty acids but which will include some unhydrolyzed oil or fat.

The water may be introduced at a distance somewhat below the upper surface 14 of the fatty material through a multiplicity of orifices so that it will pass down through the fatty material in a finely-divided condition, thus increasing the intimate contact between the water and the fatty material. This will result in further hydrolysis of the unhydrolyzed oil in the upper layer. The glycerine formed thereby will be dissolved in the water as it passes down to the fatty material and will be carried into the lower aqueous layer by the water in which it is dissolved.

This application is a continuation-in-part of my application Serial No. 285,898 filed July 22, 1939.

It is not intended that the foregoing shall be limiting in any sense upon the invention disclosed and claimed but it will be understood that variations therefrom may be made within the principles of my invention.

I claim:

1. In a countercurrent process for hydrolyzing fats with production of fatty acids and glycerine by bringing fat and water into contact with one another at a temperature above about 200° C. in an enclosed reaction chamber, the step of maintaining a substantially constant pressure in the upper part of said chamber, sufficient to maintain the reacting fatty material and water as liquid phases which comprises supplying water vapor at a pressure in excess of the pressure of saturated steam at the reaction temperature to a vapor space communicating with the upper part of the reaction chamber to form a vapor cushion.

2. In a countercurrent process for hydrolyzing fats with production of fatty acids and glycerine by bringing fat and water into contact with one another at a temperature above about 200° C. in an enclosed reaction chamber, the step of maintaining a substantially constant pressure in the upper part of said chamber, sufficient to prevent and substantial evaporation of water in said chamber which comprises supplying saturated steam at a pressure in excess of the pressure of saturated steam at the reaction temperature to a vapor space in the upper part of the reaction chamber to form a vapor cushion.

3. In a process for hydrolyzing fats with production of fatty acids and glycerine by bringing fat and water into contact with one another at a temperature above about 200° C. in an enclosed reaction chamber, the step of maintaining a sufficient pressure in the upper part of said chamber to maintain water in the liquid condition at all times by supplying water vapor at a pressure in excess of the pressure of saturated steam at the reaction temperature to a vapor space communicating with the upper part of the reaction chamber to form a vapor cushion, the temperature and pressure being below that at which a single liquid phase is formed.

4. In a continuous process for hydrolyzing fats with production of fatty acids and glycerine by causing the fat and liquid water to pass in countercurrent direction in contact with each other at a temperature above about 200° C. in a vertical reaction chamber, the step of maintaining a constant pressure in the upper part of said chamber in excess of the pressure of saturated steam at the reaction temperature, which comprises supplying the upper part of the reaction chamber with water vapor to form a vapor cushion, and releasing from the chamber excess water vapor above that required to maintain the said pressure.

5. In a continuous countercurrent process for hydrolyzing fats with liquid water at a temperature above about 200° C. in an enclosed reaction chamber, the steps of maintaining at all times a steam cushion in the upper part of the reaction chamber by the introduction of steam at a pressure in excess of the pressure of saturated steam at the reaction temperature, and releasing from the chamber any excess steam above that required to maintain the steam cushion at a pressure sufficient to maintain the reacting fatty material and water as liquid phases.

6. In a continuous countercurrent process for hydrolyzing fats at a temperature above about 200° C. in an enclosed chamber, the steps of creating and maintaining a cushion of water vapor communicating with the upper part of the chamber to absorb pressure pulsations from the liquid feed pumps, said vapor cushion being maintained at a pressure in excess of that of saturated steam at the reaction temperature.

7. In a process for hydrolyzing fats with production of fatty acids and glycerine by causing fat and liquid water to flow in countercurrent direction in contact with each other at a temperature above about 200° C. through a reaction zone, the steps of maintaining a constant and uniform temperature throughout the reaction zone, and a constant and uniform pressure on the liquids in said zone which comprises supplying steam at a pressure in excess of the pressure of saturated steam at the reaction temperature to a vapor space around the reaction zone and in communication with the liquids therein.

8. In a process for hydrolyzing fats the steps which comprise contacting fat with liquid water by countercurrent flow at a temperature above about 200° C. in a hydrolyzing chamber and maintaining substantially uniform pressure on the fat and water in the hydrolyzing chamber by supplying steam at a controlled pressure in excess of the pressure of saturated steam at the reaction temperature to a space above the reacting materials and in contact therewith.

9. In a process for hydrolyzing fats the steps which comprise contacting fat with water in liquid phase by countercurrent flow at a temperature above about 200° C. in a hydrolyzing chamber and introducing steam at a controlled pressure in excess of the pressure of saturated steam at the reaction temperature into a vapor space around and above the hydrolyzing chamber and in contact with the upper surface of the liquids in said chamber.

10. In a process for hydrolyzing fats the steps which comprise continuously contacting fat with liquid water by countercurrent flow at a temperature above about 200° C. in a hydrolyzing chamber and maintaining a substantially uniform pressure on the fats and water in the hydrolyzing chamber by continuously introducing steam at a controlled pressure in excess of the pressure of saturated steam at the reaction temperature to a space above the reacting materials and in contact with the upper surface thereof and continuously releasing from said space excess steam.

WARREN DAVEY.